United States Patent [19]

Judice

[11] 3,967,052

[45] June 29, 1976

[54] IMAGE TRANSMISSION METHOD AND APPARATUS

[75] Inventor: Charles Norris Judice, Lincroft, N.J.

[73] Assignee: Bell Telephone Laboratories, Incorporated, Murray Hill, N.J.

[22] Filed: July 17, 1975

[21] Appl. No.: 596,954

[52] U.S. Cl. ............................. 178/6; 178/DIG. 3; 178/6.8; 178/7.3 D
[51] Int. Cl.² ........................................ H04N 7/12
[58] Field of Search ............... 178/7.3 D, DIG. 3, 6, 178/6.8

[56] References Cited
UNITED STATES PATENTS

| | | | |
|---|---|---|---|
| 1,910,586 | 5/1933 | Bartholomew | 178/6.6 |
| 3,244,808 | 4/1966 | Roberts | 178/DIG. 3 |
| 3,562,420 | 2/1971 | Thompson | 178/6 |
| 3,739,082 | 6/1973 | Lippel | 178/6 |
| 3,937,878 | 2/1976 | Judice | 178/7.3 D |

OTHER PUBLICATIONS

W.F. Schreiber et al., "TV Bandwidth Reduction by Digital Coding," 1958 IRE National Convention Party pp. 88–89.
C.M. Judice et al., "Bi-Level Rendition of Continuous–Tone Pictures on an AC Plasma Panel," Conf. Rec. of 1974 pp 89–98.

Primary Examiner—Robert L. Griffin
Assistant Examiner—Edward L. Coles
Attorney, Agent, or Firm—Ronald D. Slusky

[57] ABSTRACT

The gray-scale information in a scanned image is presented on a bi-level display medium illustratively using the known ordered dither technique. In particular, the image is scanned in a matrix of picture elements, each corresponding to a different cell of the display medium. A dither threshold value is assigned to each picture element from a predetermined dither matrix. If the intensity of any given picture element is greater than the dither threshold value assigned thereto, the corresponding display cell is turned on. Otherwise, it is maintained off. The state of the cell corresponding to each picture element is represented by a dithered image bit. The bandwidth and/or time required to transmit the image to a remote display medium is substantially reduced by assembling in respective groups dithered image bits which correspond to picture elements having equal (or substantially equal) assigned dither threshold values. The resultant bit stream is then encoded for transmission via, for example, standard run-length encoding techniques.

32 Claims, 4 Drawing Figures

FIG. 2

COLUMNS

| | 0 | 1 | 2 | 3 | 4 | 5 | 6 | 7 | -------- | 61 | 62 | 63 |
|---|---|---|---|---|---|---|---|---|---|---|---|---|
| 0 | 60/0 | 50/128 | 48/32 | 43/160 | 41/0 | 69/128 | 85/32 | 72/160 | | 41/128 | 78/32 | 79/160 |
| 1 | 53/192 | 65/64 | 69/224 | 72/96 | 55/192 | 79/64 | 62/224 | 74/96 | | 60/64 | 81/224 | 83/96 |
| 2 | 69/48 | 65/176 | 62/16 | 78/144 | 81/48 | 76/176 | 62/16 | 81/144 | | 114/176 | 111/16 | 121/144 |
| 3 | 32/240 | 81/112 | 58/208 | 86/80 | 69/240 | 102/112 | 86/208 | 117/80 | | 142/112 | 143/208 | 163/80 |
| 4 | 78/0 | 81/128 | 85/32 | 100/160 | 130/0 | 157/128 | 142/32 | 170/160 | | 110/128 | 272/32 | 218/160 |
| 5 | 88/192 | 123/64 | 142/224 | 182/96 | 157/192 | 196/64 | 192/224 | 211/96 | | 204/64 | 206/224 | 225/96 |
| 6 | 159/48 | 183/176 | 178/16 | 180/144 | 211/48 | 206/176 | 218/16 | 232/144 | | 234/176 | 246/16 | 218/144 |
| 7 | 156/240 | 190/112 | 183/208 | 225/80 | 209/240 | 225/112 | 234/208 | 225/80 | | 248/112 | 234/208 | 230/80 |
| ... | | | | | | | | | | | | |
| 61 | 164/192 | 185/64 | 152/224 | 176/96 | 173/192 | 197/64 | 190/224 | 192/96 | | 196/64 | 225/224 | 220/96 |
| 62 | 119/48 | 105/176 | 105/16 | 128/144 | 137/48 | 157/176 | 161/16 | 166/144 | | 204/176 | 204/16 | 199/144 |
| 63 | 86/240 | 97/112 | 114/208 | 126/80 | 121/240 | 122/112 | 130/208 | 149/80 | | 183/112 | 182/208 | 215/80 |

ROWS

| | 0 | 1 | 2 | 3 | 4 | 5 | 6 | 7 | --- | 61 | 62 | 63 |
|---|---|---|---|---|---|---|---|---|---|---|---|---|
| 0 | 1 | 0 | 1 | 0 | 1 | 0 | 1 | 0 | | 0 | 1 | 0 |
| 1 | 0 | 1 | 0 | 0 | 0 | 1 | 0 | 0 | | 0 | 0 | 0 |
| 2 | 1 | 0 | 1 | 0 | 1 | 0 | 1 | 0 | | 0 | 1 | 0 |
| 3 | 0 | 0 | 0 | 1 | 0 | 0 | 0 | 1 | | 1 | 0 | 1 |
| 4 | 1 | 0 | 1 | 0 | 1 | 1 | 1 | 1 | | 0 | 1 | 1 |
| 5 | 0 | 1 | 0 | 1 | 0 | 1 | 0 | 1 | | 1 | 0 | 1 |
| 6 | 1 | 1 | 1 | 1 | 1 | 1 | 1 | 1 | | 1 | 1 | 1 |
| 7 | 0 | 1 | 0 | 1 | 0 | 1 | 1 | 1 | | 1 | 1 | 1 |
| ... | | | | | | | | | | | | |
| 61 | 0 | 1 | 0 | 1 | 0 | 1 | 0 | 1 | | 1 | 1 | 1 |
| 62 | 1 | 0 | 1 | 0 | 1 | 1 | 1 | 1 | | 1 | 1 | 1 |
| 63 | 0 | 0 | 0 | 1 | 0 | 1 | 0 | 1 | | 1 | 0 | 1 |

COLUMNS / ROWS

IMAGE TRANSMISSION METHOD AND APPARATUS

BACKGROUND OF THE INVENTION

The present invention relates to video signal processing and, in particular, to a method and arrangement for reducing the bandwidth and/or time required to transmit continuous-tone images which have been processed for presentation on bi-level display media.

A bi-level display medium is characterized by a plurality of closely spaced display points, or cells, each of which can have one of two visual states — fully energized (on) or fully de-energized (off). Plasma panels and pin printers, for example, are common types of bi-level display media. Picture images and other graphic data are readily displayed on a bi-level display medium via selective energization of its cells. However, due to their bi-level nature, such display media, unlike cathode-ray tube arrangements, for example, are not capable of representing gray scale, i.e., a range of intensities, at each display point location. Nonetheless, the gray-scale information in an image can, advantageously, be approximated on a bi-level display medium by known thresholding techniques. The image to be presented is scanned in a row-and-column matrix of picture elements each corresponding to a cell of the display medium. The intensity of each picture element is quantized into one of, for example, 256 levels. A threshold value is assigned to each picture element in accordance with a predetermined criterion. A cell of the display medium is energized only if the intensity of the corresponding picture element exceeds the threshold value assigned thereto.

A number of thresholding techniques of the above-described type are known in the art, each having a different criterion for assigning appropriate threshold values to the scanned picture elements. For example, so-called adaptive threshold techniques assign threshold values in response to the intensities of selected picture elements in the scanned image. The constrained average technique disclosed in the copending patent application of J. F. Jarvis, Ser. No. 576,163, filed May 9, 1975, and assigned to the same assignee as this application, is exemplary.

So-called "non-adaptive" thresholding techniques, on the other hand, assign threshold values to each picture element solely in accordance with the position of that picture element in the picture element matrix. Foremost among the nonadaptive thresholding techniques is the ordered dither, or more simply "dither", technique. In a dithered display system, the picture elements are divided into a plurality of submatrices. Each picture element from each submatrix is assigned a spatially corresponding threshold value from a predetermined "dither matrix". A display cell is energized as described above, i.e., only if the intensity of the corresponding picture element exceeds the threshold value assigned to that picture element.

Since each cell of a bi-level display medium can be in only one of two states, its intensity can be specified by a single "display bit". By contrast, eight bits are required to specify in which of the 256 intensity levels each picture element of the original scanned image resides. The number of bits per picture element, or bit rate, determines the bandwidth per unit time or, equivalently, the time per unit bandwidth required to transmit a frame of video information. Thus an image processed via one of the above-described thresholding techniques can be transmitted at substantially reduced bandwidth and/or transmission time as compared to a full-gray-scale, e.g., standard television, image. (The tradeoff is slightly reduced spatial resolution and some loss of gray-scale information.) However, for many video systems it may be desired to reduce bandwidth and/or transmission time requirements even further since this almost invariably translates into lower capital and operating costs. Moreover, it appears that the economic feasibility of such still-experimental video systems as electronic mail and other fast facsimile arrangements will hinge to a great extent on the degree to which the bandwidth and/or transmission time required by such systems can be minimized.

SUMMARY OF THE INVENTION

Accordingly, a general object of the invention is to provide an improved video display system, and in particular, to provide a method and arrangement for minimizing the bandwidth and/or transmission time required by such systems.

A more specific object of the invention is to provide a method and arrangement for minimizing the bandwidth and/or transmission time required to transmit images processed via the above-described thresholding techniques.

These and other objects are achieved in accordance with the invention by assembling the display bits in respective groups in accordance with the values of the thresholds assigned thereto. In accordance with a feature of the invention, each group comprises display bits corresponding to picture elements having equal (or substantially equal) assigned threshold values. I have found that when the bits are thus assembled, the bits comprising many of the groups tend to have the same value — either 0 or 1. The bits can thus be advantageously coded for transmission at substantial bandwidth and/or transmission time savings, using, for example, standard run-length encoding techniques.

The invention has been found to be particularly advantageous when implemented in a dithered display system. In a first illustrative embodiment disclosed herein, the above-described display bit assembling is performed by scanning and dither processing the image to be reproduced on a row-by-row basis. All picture elements in the first row of the scanned image which have a particular assigned dither threshold value are scanned first. As each such picture element is scanned in turn, it is compared to that dither threshold value and the appropriate dithered image display bit generated in response to each comparison. Thereafter, all picture elements in the first row which have a particular second assigned dither threshold value are scanned and dither processed, and so forth for all the picture elements in the first row. Scanning proceeds in similar manner for the second and each subsequent row of the image and the appropriate dithered image display bits generated in each case.

In a second illustrative embodiment, dithered image display bit assembling is performed by scanning and dither processing the image to be reproduced on a full-image basis. All picture elements in the entire image which have a particular one (illustratively the smallest) assigned dither threshold value are scanned first. As each such picture element is scanned, it is compared to that dither threshold value and the appropriate dithered image display bit is generated in response to each comparison. Then all picture elements in the image having a particular second (illustratively the second lowest) assigned dither threshold value are scanned and dither processed, and so forth for the rest of the image.

BRIEF DESCRIPTION OF THE DRAWING

The invention may be clearly understood from a consideration of the following detailed description and accompanying drawing in which:

FIG. 2 is a chart which shows quantized picture element intensity values of an illustrative image scanned by the display system of FIG. 1, and which further shows the dither threshold values assigned to those picture elements;

DETAILED DESCRIPTION

Figure 1:
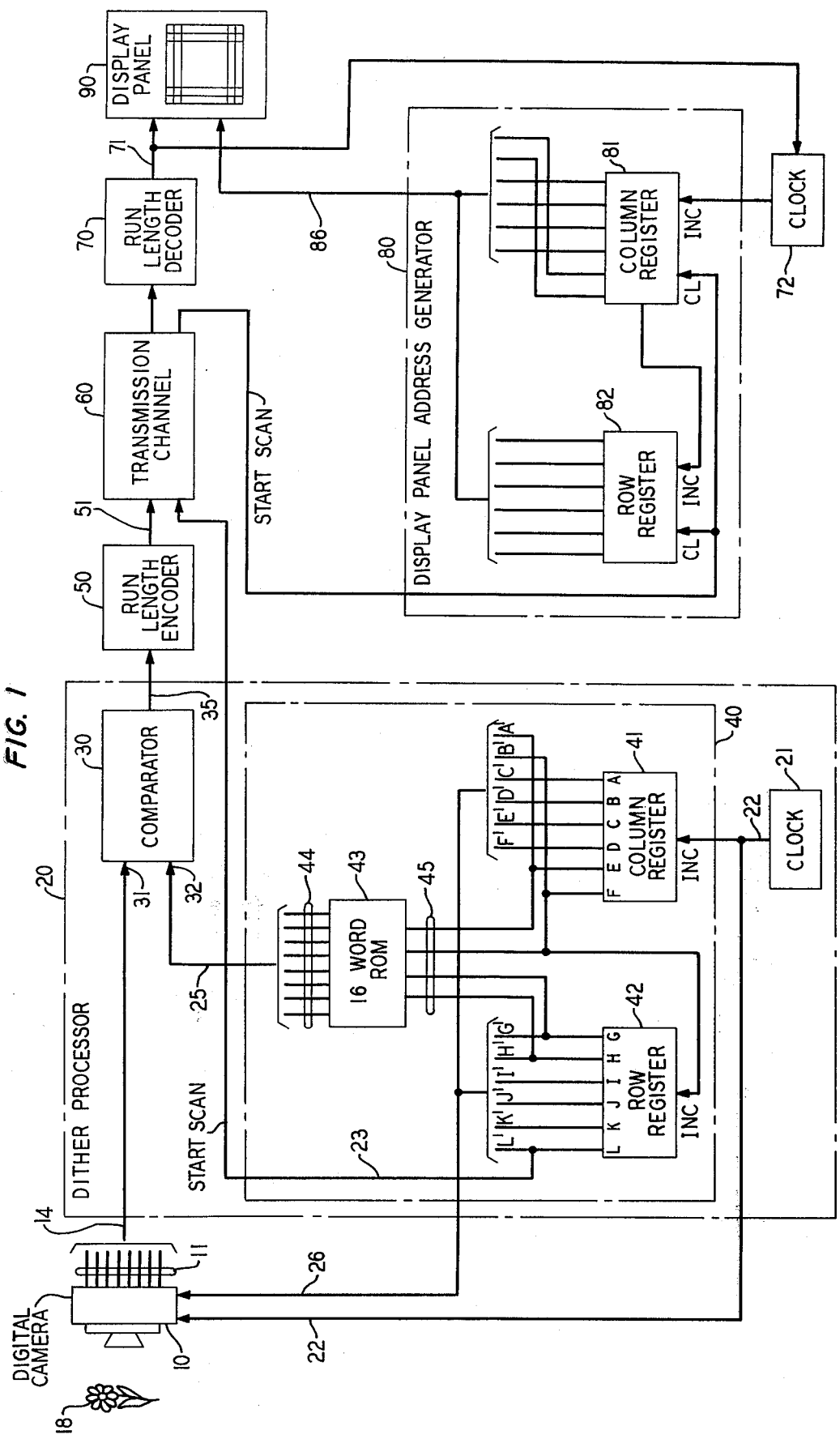
FIG. 1 is a block diagram of an illustrative dithered display system which assembles dithered image bits in accordance with the invention on a row-by-row basis.

The display system of FIG. 1 includes digital camera 10, dither processor 20, run-length encoder 50, transmission channel 60, run-length decoder 70, display panel address generator 80 and bi-level display panel 90.

Display panel 90, which may be an ac plasma display panel, for example, comprises a square matrix of 4096 display cells. An illustrative image 18 to be presented on panel 90 is scanned in a matrix of 4096 picture elements, each corresponding to a different cell of panel 90. As indicated in FIG. 2, the 64 rows and 64 columns of the picture element matrix are each numbered serially from 0 to 63. The intensity of each scanned picture element of image 18 is quantized into one of (illustratively) 256 intensity levels, or values, between 0 and 255. These are indicated by the upper number at each picture element location in FIG. 2.

Since panel 90 is a bi-level display medium, its cells can reside in only one of two states — either fully energized, or on, or fully de-energized, or off. Thus, unlike a full-gray-scale display medium, such as a cathode-ray tube, a bi-level display panel cannot present the full-gray-scale information, i.e., the precise intensity, of each scanned picture element of image 18. Advantageously, however, a substantial portion of this gray-scale information is represented on panel 90 via the ordered dither thresholding technique. As indicated in FIG. 2, the scanned image picture element matrix is divided into a plurality of 16-element submatrices. Each threshold value from the illustrative dither matrix $$\begin{bmatrix} 0 & 128 & 32 & 160 \\ 192 & 64 & 224 & 96 \\ 48 & 176 & 16 & 144 \\ 240 & 112 & 208 & 80 \end{bmatrix}$$

is assigned to a spatially corresponding picture element in each submatrix. The lower number at each picture element location is the dither threshold value assigned that picture element. The quantized intensity value of each picture element is then compared to its assigned dither threshold value. If the intensity value of any given picture element is greater than its assigned dither threshold value, the corresponding cell in the display panel is turned on. Otherwise, the cell is maintained off.

Figures 3, 4:
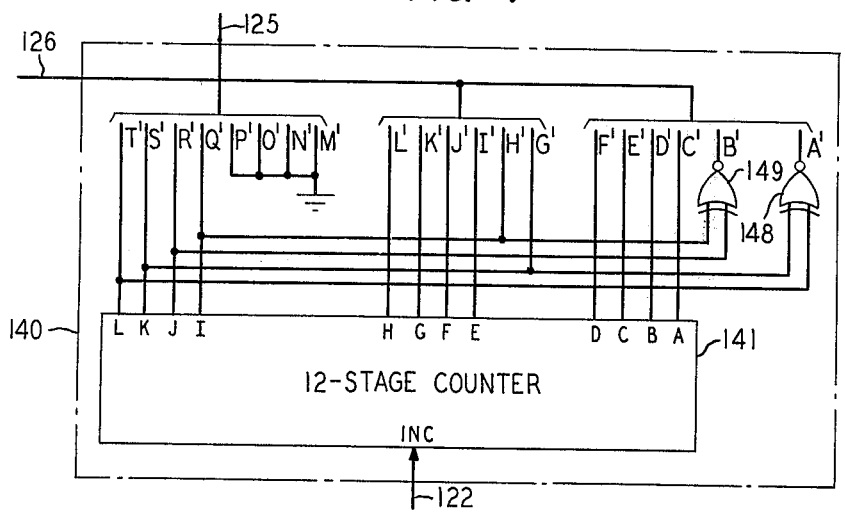
FIG. 3 is a chart which shows the dithered image display bit values generated in response to the above-mentioned illustrative scanned image.
FIG. 4 shows circuitry for modifying the display system of FIG. 1 to assemble dithered image bits in accordance with the invention on a full-image basis.

FIG. 3 depicts the pattern of on and off cells generated when image 18 is dither processed in the manner described above. On and off cells are represented in FIG. 3 by display bits (hereinafter referred to as "dithered image bits") of value 1 and 0, respectively. When a large number of closely-spaced bi-level display cells are selectively energized in accordance with a dithered image bit pattern such as that of FIG. 3, a gray-scale representation of the original scanned image is provided. See, for example, the dithered images in my copending patent application, Ser. No. 560,505, filed Mar. 19, 1975.

A dithered image may be transmitted from one point to another by transmitting, for example, in a serial bit stream, the value of each and every dithered image bit. However, this approach is wasteful of bandwidth and transmission time. In accordance with the present invention, the dithered image bits corresponding to picture elements having equal (or approximately equal) assigned dither threshold values are assembled in respective groups within the bit stream. The bit stream thus assembled advantageously contains many long runs of 0's and many long runs of 1's and is accordingly well-adapted to be encoded at substantial bandwidth and/or transmission time savings via, for example, known run-length encoding techniques.

In the illustrative embodiment of FIG. 1, assembling of dithered image bits in accordance with the invention is implemented by scanning and dither processing the image to be reproduced on a row-by-row basis. Referring, for example, to FIG. 2, the first picture elements to be scanned are those 16 picture elements in row 0 which have 0 as their assigned dither threshold value. As each picture element is scanned, its intensity is compared to the dither threshold 0 and the appropriate dithered image bit generated. The next picture elements to be scanned for dither processing are the sixteen picture elements in row 0 which have 128 as their assigned dither threshold value. Scanning in row 0 proceeds similarly for the picture elements having assigned dither threshold value of 32 and then 160. Rows 1 through 63 are scanned similarly.

There are two principal reasons why the assembling of dithered image bits in groups as described above promotes long runs of 0's and of 1's in the dither bit stream. Firstly, picture elements which are in close proximity to each other in a scanned image usually have intensities which do not differ greatly. Thus, over short distances in the scanned image (e.g., every fourth picture element of a single row as in the illustrative embodiment), picture elements having equal (or substantially equal) assigned threshold values are likely to have corresponding display cells which are in identical states, independent of the threshold value magnitude. Moreover, the statistical likelihood of a cell being in one or the other of its two states is related to the magnitude of the threshold value assigned to the corresponding picture element. The smaller the threshold value assigned to a given picture element the more likely the corresponding display cell is to be on. Similarly, the larger the threshold value assigned to a given picture element, the more likely the corresponding display cell is to be off. Thus even over widely separated distances in the scanned image, cells corresponding to picture elements having equal (or substantially equal) threshold values are statistically likely to have the same state — especially when those threshold values are relatively small, or alternatively, relatively large.

In the display system of FIG. 1, generation of dithered image bits and row-by-row assembling thereof in accordance with the invention are principally controlled by dither processor 20. Processor 20 includes clock 21, comparator 30 and address/threshold generator 40. The latter, in turn, includes 6-bit column register 41, six-bit row register 42, and 16-word read-only memory (ROM) 43. The lowest-through highest-order output bits of register 41 are provided at terminals A through F, respectively. The lowest-through highest-order output bits of register 42 are provided at terminals G through L, respectively.

The row and column addresses of picture elements to be scanned by camera 10 are provided by generator 40 over cable 26. In particular, cable 26 provides the lowest-through highest-order bits of the column addresses on leads A' through F', respectively, and the lowest-through highest-order bits of the row addresses on leads G' through L', respectively. Leads A', B', C', D', E' and F' are connected to output terminal E, F, A, B, C and D, respectively. Leads G' through L' are connected to output terminal G through L, respectively.

ROM 43 stores the 16 dither threshold values 0, 128, 32, 160, 192, 64, 224, 96, 48, 176, 16, 144, 240, 112, 208 and 80. Binary representations of these numbers are extended to input terminal 32 of comparator 30 via output leads 44 and cable 25 in response to binary addresses 0000, 0001, 0010, 0011, 0100, 0101, 0110, 0111, 1000, 1001, 1010, 1011, 1100, 1101, 1110, 1111, respectively, provided on memory address leads 45. The two lowest-order bits of the address on leads 45 are taken from output terminals E and F of register 41. The two highest-order bits of the address on leads 45 are taken from output terminals G and H of register 42.

Clock 21 generates a train of regularly-spaced clock pulses, which are extended via lead 22 to both register 41 and camera 10. Each clock pulse on lead 22 increments column register 41 by one count. Register 41, in turn, increments register 42 one count for each 64 clock pulses. Each clock pulse also causes camera 10 to scan image 18 at the picture element location then indicated on cable 26. (Camera 10 may be, for example, the commercially available EMR Photoelectric Optical Data Digitizer). The intensity of each scanned picture element is provided in digital form on binary leads 11 and is extended therefrom to input terminal 31 of comparator 30 via cable 14.

In operation, assume that a clock pulse has just established register 41 in its 000000 state. Register 42 is thus also in its 000000 state. The column and row addresses on cable 26 are both 000000, and camera 10 scans the picture element in row 0, column 0 of image 18. The address on leads 45 is 0000. Thus ROM 43 provides the dither threshold value 0 to terminal 32. Comparator 30 compares the intensity of the scanned picture element to 0 and generates the appropriate dithered image bit value on lead 35.

The next clock pulse increments the count in register 41 by one to 000001, thereby increasing the column address on leads A' through F' of cable 26 by four to 000100. The picture element in row 0, column 4 is thus scanned and compared to its assigned dither threshold value, 0. Each further clock pulse advances the column address on cable 26 by four until all 16 of the picture elements in row 0 having an assigned dither threshold value of 0 have been scanned and the appropriate dithered image bit values provided serially as a group on lead 35.

The next clock pulse establishes the count in register 41 at 010000. The corresponding column address on cable 26 is 000001. The picture element at row 0, column 1 is scanned. The address on leads 45 is now 0001. The dither threshold value provided on cable 25 for comparison to the scanned picture element intensity is 128. The next 15 clock pulses each increase the column address on cable 26 by four. However, the address on leads 45 remains unchanged. Thus it is seen that the scanned intensities of all 16 picture elements in row 0 having an assigned dither threshold value of 128 are compared to that threshold value one after the other. The appropriate dithered image bits are again provided serially as a group on lead 35.

In a similar manner, subsequent clock pulses operate camera 10 and dither processor 20 to generate dithered image bits for the picture elements in row 0 which have 32 as their assigned dither threshold and then those having 160 as their assigned dither threshold.

At the next clock pulse, the count in column register 41 returns to 000000. In so doing, it increments row register 42 to the count 000001. Scanning thus proceeds for row 1 in a manner similar to that described above; all picture elements having assigned dither threshold values of 192 are scanned as a group, followed by those having assigned dither threshold values of 64, then 224, then 96. After all of row 1 has been scanned, row register 42 is advanced to the count 000010 to scan row 2 and so forth for rows 3–63.

The clock pulse following the scanning of the 4096th picture element, which is located at row 63, column 63, returns register 41, and thus register 42 to 000000. The transition from 1 to 0 at terminal L is provided on lead 23 as an end-of-scan indication.

The dither bit stream on lead 35 is extended to run-length encoder 50, which generates a succession of binary code words on lead 51. Each code word indicates the number of bits, or the "run-length", between successive 0 to 1 and 1 to 0 transitions in the dither bit stream. Each code word also illustratively includes the binary value of the bits in the corresponding run. The encoded bit stream on lead 51 is transmitted over transmission channel 60 and is thereafter decoded by run-length decoder 70. Encoder 50 and decoder 70 may respectively comprise virtually any known run-length encoder and decoder arrangements, such as those shown by W. F. Schreiber et al in 1958 *IRE Convention Record*, Part 4, pp. 88–99.

The decoded dithered image display bit values are extended from decoder 70 to display panel 90 via lead 71 and are directed to the appropriate cells of panel 90 for display by display panel address generator 80. In particular, generator 80 extends display cell addresses for panel 90 over cable 86 in the same order that the picture elements of image 18 are scanned by camera 10. Generator 80 includes column address register 81 and row address register 82. Each end-of-scan indication on lead 23, extend to generator 80 via transmission channel 60, initially clears both registers 81 and 82 to the count 000000. Thereafter, clock 72 increments register 81 by one count as each display bit of a subsequently received dithered image is presented to panel 90 on lead 71. Clock 72, which operates in response to the dither bit stream on lead 71 may be, for example, a digital phase-locked loop of known type. With the exception of circuitry for clearing registers 81 and 82, as discussed above, the circuit configuration and operation of registers 81 and 82 is substantially identical to that of registers 41 and 42 in address generator 40. Thus, generator 80 need not be described in further detail.

The row-by-row scanning sequence used in the display system of FIG. 1 is but one of many possible sequences which assembles dithered image bit in groups in accordance with the invention. As an alternative, for example, scanning may be effected on a full-image basis, in which each and every picture element in the image having the lowest assigned dither threshold value (i.e., 0) is scanned first. Thereafter, each and every picture element in the image having the second lowest assigned dither threshold value (16) is scanned, then the next lowest (32) and so forth.

Advantageously, the display system of FIG. 1 can be easily modified to implement this full-image scan sequence by substituting address/threshold generator 140 shown in FIG. 4 for address/generator 40 in the display system of FIG. 1. Address/generator 140 comprises 12-stage binary counter 141 and exclusive-OR gates 148 and 149. The lowest-to-highest order output terminals of counter 141 comprise terminals A through L, respectively. The inputs to gate 148 are taken from terminals K and L. The inputs to gate 149 are taken from terminals I and J.

With the display system of FIG. 1 modified to include generator 140 in place of generator 40, addresses for camera 10 are provided on cable 126. The latter includes binary address leads A' through L'. Leads A' through F' carry the lowest-through highest-order column address bits, respectively, while leads G' through L' carry the lowest-through highest-order row address bits, respectively. Leads A' and B' are taken from the output terminals of gates 148 and 149, respectively. Leads C' through F' are taken from output terminals A through D, respectively. Leads G' through L' are taken from output terminals K, I, E, F, G and H, respectively.

Dither threshold values are extended to comparator 30 via binary leads M' through T' and cable 125. The four lowest-order leads on cable 125, M' through P', are connected to ground (i.e., logic 0), while the four highest order leads M' through T' are taken from output terminals I, J, K and L, respectively, of counter 141. Accordingly, a new dither threshold value is extended to comparator 30 for each 256 scanned picture elements, each new dither threshold value being greater by sixteen than the previous. The proper dither threshold values for the above-discussed full-scan sequence are thus provided.

When the display system of FIG. 1 is modified to implement the full-image scanning sequence in the manner described above, circuitry substantially identical to generator 140 (but without cable 125, for example) may be advantageously utilized to replace display panel address generator 80.

Specific embodiments and applications of the invention have been shown and described herein. However, it will be appreciated that these are only illustrative of the invention. For example, the invention has been described principally in connection with an ac plasma panel display system. However, the principles of the invention are equally applicable to facsimile and other "hard-copy" image transmission arrangements.

Moreover, it has been specifically indicated herein that a dither bit stream, for example, which has been provided with long runs of 0s and 1s in accordance with the bit assembling technique of the present invention may be advantageously encoded for transmission at significant bandwith and/or transmission time savings via known run-length encoding techniques. However, it may be found by those skilled in the art that other transmission encoding techniques may be able to take advantage of those long runs to similar advantage.

Both the row-by-row and full-image scanning sequences described herein enable an image represented by a plurality of bi-level display bits to be encoded at substantial bandwidth and/or transmission time savings in accordance with the invention. Similar savings may be provided using numerous other scanning sequences within the scope of the invention. Such other scanning sequences will readily occur to those skilled in the art. In a given application, however, a particular scanning sequence may prove to provide the greatest bandwidth and/or transmission time savings. This will depend on such criteria as the nature of the images to be scanned and the particular run-length or other encoding technique which is used.

In addition, where the invention is implemented in a dithered display system, it should be noted that although the dither matrix utilized in the display system of FIG. 1 has 16 thresholds, other size dither matrices such as those having four thresholds or 64 thresholds are also commonly used. In generating a dither matrix for a given application, the dither matrix size is first decided upon. The threshold values are then chosen. It is conventional to distribute the threshold values across substantially the entire picture element intensity quantization range (in the illustrative embodiment, the range 0–255), with numerically successive threshold values having a constant difference between them. However, other threshold value selection criteria may be employed to provide, for example, increased or decreased contrast and/or brightness in the dithered image. See my copending application, Ser. No. 560,505, filed Mar. 19, 1975.

The selected threshold values are then arranged within the dither matrix. It has been found that optimum gray-scale and picture resolution characteristics are achieved when numerically successive threshold values are substantially spatially separated from one another within the matrix. In the dither matrix utilized in the display system of FIG. 1, for example, the 0 is relatively distant from the 16, which is relatively distant from the 32 and so forth.

More generally, the above-described spatial separation criterion can be satisfied for an $n$-by-$n$ dither matrix, for example, $n$ being an integer power of 2, by arranging the $n^2$ threshold values of the dither matrix in the order defined by a dither operator $\hat{D}_n$. The latter is derived by combining the four operator matrices $[4\hat{D}_{n/2}]$, $[4\hat{D}_{n/2} + \hat{U}_{n/2}]$, $[4\hat{D}_{n/2} + 2\hat{U}_{n/2}]$ and $[4\hat{D}_{n/2} + 3\hat{U}_{n/2}]$ in two-by-two arrangements such as $$\hat{D}_n = \begin{bmatrix} [4\hat{D}_{n/2}] & [4\hat{D}_{n/2} + 2\hat{U}_{n/2}] \\ [4\hat{D}_{n/2} + 3\hat{U}_{n/2}] & [4\hat{D}_{n/2} + \hat{U}_{n/2}] \end{bmatrix}$$

This is a recursive definition in which $\hat{D}_2$ is a two-by-two matrix comprising the numbers 0, 1, 2 and 3 such as the matrix $$\begin{bmatrix} 0 & 2 \\ 3 & 1 \end{bmatrix}$$

and $\hat{U}_2$ is a two-by-two matrix each element of which is 1. It is preferable, although not necessary, that the operator matrices $[4\hat{D}_{n/2}]$ and $[4\hat{D}_{n/2} + \hat{U}_{n/2}]$ be on the same one diagonal of dither operator $\hat{D}_n$, such as in the above arrangement, and the numbers 0 and 1 be on the same one diagonal of operator matrix $\hat{D}_2$.

Using the above definition, one of several possible $\hat{D}_4$ dither operators is, for example, $$\hat{D}_4 = \begin{bmatrix} 0 & 8 & 2 & 10 \\ 12 & 4 & 14 & 6 \\ 3 & 11 & 1 & 9 \\ 15 & 7 & 13 & 5 \end{bmatrix}$$

The dither matrix, $$\begin{bmatrix} 0 & 128 & 32 & 160 \\ 192 & 64 & 224 & 96 \\ 48 & 176 & 16 & 144 \\ 240 & 112 & 208 & 80 \end{bmatrix},$$

is thus seen to have been derived by taking the threshold values 0, 16, 32, 48, et cetera, which were previously selected, and placing them in the 0, 1, 2, 3, et cetera, positions, respectively, of the $\hat{D}_4$ dither operator.

Finally, it should be emphasized that, although the invention has been described principally in connection with the ordered dither technique, it may be used in connection with any of numerous known threshold-determining techniques, particularly those which assign a threshold value to each picture element solely in accordance with its spatial position in the picture element matrix.

Thus, it will be appreciated that many and varied arrangements in accordance with the principles of the invention may be devised by those skilled in the art without departing from the spirit and scope thereof.

I claim:

1. In a display system adapted to receive a signal representing the respective intensities of picture elements of a scanned image, said picture elements having respective assigned threshold values and said display system including means responsive to said signal for generating a plurality of display bits, the value of each display bit being determined by the intensity of a corresponding one of said picture elements and the threshold value assigned to said corresponding one of said picture elements, a generating means characterized by means for assembling said display bits in respective groups, each of said groups comprising ones of said display bits corresponding to picture elements having substantially equal assigned threshold values.

2. The invention of claim 1 further comprising means operative for sequentially scanning said picture elements to provide said signal, and wherein said assembling means includes means for operating said scanning means to scan in immediate succession the picture elements corresponding to said ones of said display bits.

3. The invention of claim 2 wherein the threshold value assigned to each picture element is determined exclusively by the location of said each picture element in said image.

4. In a display system adapted to receive a signal representing the respective intensities of a matrix of scanned image picture elements, each of said picture elements having a predetermined threshold assigned thereto, said display system including means for generating a succession of display bits each corresponding to a different one of said picture elements, the value of each display bit being determined by the intensity of its corresponding picture element and the value of the threshold assigned to said corresponding picture element, said generating means characterized by means for positioning each said display bit in said succession such that display bits corresponding to picture elements having substantially equal assigned thresholds are immediately adjacent to one another in said succession.

5. The invention of claim 4 wherein said picture elements are arranged in plurality of submatrices of said picture element matrix, and wherein the threshold assigned to each picture element of each of said submatrices comprises a spatially corresponding threshold from a predetermined dither matrix in which thresholds having numerically successive values are substantially spatially separated from one another.

6. The invention of claim 5 wherein said dither matrix comprises $n^2$ dither thresholds, $n$ being an integer power of 2, and wherein said dither thresholds are arranged substantially in accordance with the order defined by a dither operator $\hat{D}_n$, said dither operator $\hat{D}_n$ comprising the matrices $[4\hat{D}_{n/2}]$, $[4\hat{D}_{n/2} + \hat{U}_{n/2}]$, $[4\hat{D}_{n/2} + 2\hat{U}_{n/2}]$ and $[4\hat{D}_{n/2} + 3\hat{U}_{n/2}]$ in two-by-two arrangement, $\hat{D}_2$ being a two-by-two matrix comprising the numbers 0, 1, 2 and 3 and $\hat{U}_2$ being a two-by-two matrix each element of which is 1.

7. The invention of claim 4 wherein the value of the threshold assigned to each picture element is determined exclusively by the location of said each picture element in said matrix and wherein said generating means includes means for providing a first value for each of said display bits having a corresponding picture element intensity which exceeds the value of its assigned threshold and for providing a second value for each of said display bits having a corresponding picture element intensity which does not exceed the value of its assigned threshold.

8. The invention of claim 7 wherein a first plurality of picture elements in a first row of said matrix have a first assigned threshold value and a second plurality of picture elements in said row have a second assigned threshold value and wherein said positioning means comprises means for generating the display bits corresponding to said first plurality picture elements and for thereafter generating the display bits corresponding to said second plurality picture elements.

9. The invention of claim 8 further comprising means for run-length encoding said succession of display bits.

10. In a display system comprising
means for receiving a signal representing the respective intensities of a row-and-column matrix of scanned image picture elements, each of a first plurality of said picture elements having assigned dither threshold values which are substantially equal to each other, each of a second plurality of said picture elements having assigned dither threshold values which are substantially equal to each other, and each second plurality picture element being located in a selected row of said matrix between two of said first plurality picture elements, means for generating a plurality of display bits each corresponding to a respective one of said first and second plurality picture elements, said generating means including means for determining the value of each display bit in response to a comparison between the intensity of the picture element corresponding to said each display bit and the dither threshold value assigned to said corresponding picture element, and means for receiving said display bits, said generating means further including means for providing the display bits corresponding to each of said first plurality picture elements to said receiving means and for thereafter providing the display bits corresponding to each of said second plurality picture elements to said receiving means.

11. The invention of claim 10 further comprising a matrix of selectively energizable display cells and means for extending said display bits from said receiving means to said display cell matrix to energize selected ones of said display cells in accordance with the values of said display bits.

12. The invention of claim 11 wherein said extending means includes means for run-length encoding said display bits, means for transmitting said display bits over a transmission channel, and means for decoding said display bits.

13. In a display system, means for scanning an image in a matrix of picture elements, each of said picture elements having an associated intensity and each of plurality of predetermined threshold values being assigned to a plurality of said picture elements, and means operative in response to the scanning of each of said picture element for providing a predetermined indication if its intensity is greater than its assigned threshold value, said scanning means comprising scanning circuit means for scanning in immediate succession ones of said picture elements having substantially equal assigned threshold values.

14. The invention of claim 13 wherein said picture elements are arranged in a plurality of submatrices of said picture element matrix and wherein the threshold value assigned to each picture element of each of said submatrices comprises a spatially corresponding threshold value from a predetermined dither matrix in which numerically successive threshold values are substantially spatially separated from one another.

15. The invention of claim 14 wherein said scanning circuit means comprises means for scanning in immediate succession picture elements occupying corresponding spatial positions in said submatrices.

16. The invention of claim 15 wherein said dither matrix comprises $n^2$ dither thresholds, $n$ being an integer power of 2, and wherein said dither thresholds are arranged substantially in accordance with the order defined by a dither operator $\hat{D}_n$, said dither operator $\hat{D}_n$ comprising the matrices $[4\hat{D}_{n/2}]$, $[4\hat{D}_{n/2} + \hat{U}_{n/2}]$, $[4\hat{D}_{n/2} + 2\hat{U}_{n/2}]$ and $[4\hat{D}_{n/2} + 3\hat{U}_{n/2}]$ in two-by-two arrangement, $\hat{D}_2$ being a two-by-two matrix comprising the numbers 0, 1, 2 and 3 and $\hat{U}_2$ being a two-by-two matrix each element of which is 1.

17. In a display system, a method comprising the steps of receiving a signal representing the respective intensities of picture elements of a scanned image, said picture elements having respective assigned threshold values, and generating a plurality of display bits in response to said signal, the value of each display bit being determined by the intensity of corresponding one of said picture elements and the threshold value assigned to said corresponding one of said picture elements, said generating step characterized by the step of assembling said display bits in respective groups, each of said groups comprising ones of said display bits corresponding to picture elements having substantially equal assigned threshold values.

18. The invention of claim 17 wherein said display system includes means operative for sequentially scanning said picture elements to provide said signal, and wherein said assembling step includes the step of operating said scanning means to scan in immediate succession the picture elements corresponding to said ones of said display bits.

19. The invention of claim 18 wherein the threshold value assigned to each picture element is determined exclusively by the location of said each picture element in said image.

20. In a display system adapted to receive a signal representing the respective intensities of a matrix of scanned image picture elements, each of said picture elements having a predetermined threshold assigned thereto, a method comprising the steps of generating a succession of display bits each corresponding to a different one of said picture elements, the value of each display bit being determined by the intensity of its corresponding picture element and the value of the threshold assigned to said corresponding picture element, said generating step characterized by the step of positioning each said display bit in said succession such that display bits corresponding to picture elements having substantially equal assigned thresholds are immediately adjacent to one another in said succession.

21. The invention of claim 20 wherein said picture elements are arranged in plurality of submatrices of said picture element matrix, and wherein the threshold assigned to each picture element of each of said submatrices comprises a spatially corresponding threshold from a predetermined dither matrix in which thresholds having numerically successive values are substantially spatially separated from one another.

22. The invention of claim 21 wherein said dither matrix comprises $n^2$ dither thresholds, $n$ being an integer power of 2, and wherein said dither thresholds are arranged substantially in accordance with the order defined by a dither operator $\hat{D}_n$, said dither operator $\hat{D}_n$ comprising the matrices $[4\hat{D}_{n/2}]$, $[4\hat{D}_{n/2} + \hat{U}_{n/2}]$, $[4\hat{D}_{n/2} + 2\hat{U}_{n/2}]$ and $[4\hat{D}_{n/2} + 3\hat{U}_{n/2}]$ in two-by-two arrangement, $\hat{D}_2$ being two-by-two matrix comprising the numbers 0, 1, 2 and 3 and $\hat{U}_2$ being a two-by-two matrix each element of which is 1.

23. The invention of claim 20 wherein the value of the threshold assigned to each picture element is determined exclusively by the location of said each picture element in said matrix and wherein said generating step includes the steps of providing a first value for each of said display bits having a corresponding picture element intensity which exceeds the value of its assigned threshold, and providing a second value for each of said display bits having a corresponding picture element intensity which does not exceed the value of its assigned threshold.

24. The invention of claim 23 wherein first plurality of picture elements in a first row of said matrix have a first assigned threshold value and a second plurality of picture elements in said row have a second assigned threshold value and wherein said positioning step comprises the steps of generating the display bits corresponding to said first plurality picture elements and thereafter generating the display bits corresponding to said second plurality picture elements.

25. The invention of claim 24 comprising the further step of run-length encoding said succession of display bits.

26. In a display system, a method comprising the steps of receiving a signal representing the respective intensities of row-and-column matrix of scanned image picture elements, each of a first plurality of said picture elements having assigned dither threshold values which are substantially equal to each other, each of a second plurality of said picture elements having assigned dither threshold values which are substantially equal to each other, and each second plurality picture element being located in a selected row of said matrix between two of said first plurality picture elements, and generating a plurality of display bits each corresponding to a respective one of said first and second plurality picture elements, said generating step including the step of determining the value of each display bit in response to a comparison between the intensity of the picture element corresponding to said each display bit and the dither threshold value assigned to said corresponding picture element, said generating step including the further steps of providing the display bits corresponding to each of said first plurality picture elements to a receiving circuit and thereafter providing the display bits corresponding to each of said second plurality picture elements to said receiving circuit 27. The invention of claim 26 comprising the further steps of extending said display bits from said receiving circuit to a matrix of selectively energizable display cells, and energizing selected ones of said display cells in accordance with the values of said display bits.

28. The invention of claim 27 wherein said extending step includes the steps of run-length encoding said display bits, transmitting said display bits over a transmission channel, and decoding said display bits.

29. In a display system, a method comprising the steps of scanning an image in a matrix of picture elements, each of said picture elements having an associated intensity and each of a plurality of predetermined threshold values being assigned to a plurality of said picture elements, and providing a predetermined indication in response to the scanning of each said picture element if its intensity is greater than it assigned threshold value, said image scanning step comprising the step of scanning in immediate succession ones of said picture elements having substantially equal assigned threshold values.

30. The invention of claim 29 wherein said picture elements are arranged in plurality of submatrices of said picture element matrix and wherein the threshold value assigned to each picture element of each of said submatrices comprises a spatially corresponding threshold value from a predetermined dither matrix in which numerically successive threshold values are substantially spatially separated from one another.

31. The invention of claim 30 wherein said picture element scanning step comprises the step of scanning in immediate succession picture elements occupying corresponding spatial positions in said submatrices.

32. The invention of claim 31 wherein said dither matrix comprises $n^2$ dither thresholds, $n$ being an integer power of 2, and wherein said dither thresholds are arranged substantially in accordance with the order defined by a dither operator $\hat{D}_n$, said dither operator $\hat{D}_n$ comprising the matrices $[4\hat{D}_{n/2}]$, $[4\hat{D}_{n/2} + \hat{U}_{n/2}]$, $[4\hat{D}_{n/2} + 2\hat{U}_{n/2}]$ and $[4\hat{D}_{n/2} + 3\hat{U}_{n/2}]$ in two-by-two arrangement, $\hat{D}_2$ being a two-by-two matrix comprising the numbers 0, 1, 2 and 3 and $\hat{U}_2$ being a two-by-two matrix each element of which is 1.

* * * * *